(12) United States Patent
Mirabile (10) Patent No.: US 7,938,420 B1
(45) Date of Patent: May 10, 2011

(54) BICYCLE DRIVE MECHANISM WITH PEDAL LEVERAGE ARM

(76) Inventor: Nicholas F. Mirabile, N. Richland Hills, TX (US)

( * ) Notice: Subject to any disclaimer, the term of this patent is extended or adjusted under 35 U.S.C. 154(b) by 0 days.

(21) Appl. No.: 12/657,072

(22) Filed: Jan. 12, 2010

(51) Int. Cl.
*B62M 1/00* (2010.01)

(52) U.S. Cl. .......................................... 280/252; 280/253

(58) Field of Classification Search .................. 280/210, 280/251, 252, 253, 254, 255, 256, 257, 258
See application file for complete search history.

(56) References Cited

U.S. PATENT DOCUMENTS

| | | | | |
|---|---|---|---|---|
| 416,016 A * | 11/1889 | Schrader | ............................ | 74/134 |
| 1,148,419 A * | 7/1915 | White | ............................ | 280/254 |
| 1,505,271 A * | 8/1924 | McNell | ............................ | 280/253 |
| 3,888,512 A * | 6/1975 | Peterson | ............................ | 280/255 |
| 3,891,235 A * | 6/1975 | Shelly | ............................ | 280/252 |
| 3,998,469 A * | 12/1976 | Ruys | ............................ | 280/254 |
| 5,121,654 A * | 6/1992 | Fasce | ............................ | 74/594.2 |
| 5,716,069 A * | 2/1998 | Bezerra et al. | ............................ | 280/254 |
| 5,785,337 A * | 7/1998 | Ming | ............................ | 280/255 |
| 6,454,287 B1 * | 9/2002 | Fujiwara et al. | ............................ | 280/252 |
| 2008/0054589 A1 * | 3/2008 | Scarborough | ............................ | 280/254 |

* cited by examiner

*Primary Examiner* — Lesley Morris
*Assistant Examiner* — Marc A Scharich
(74) *Attorney, Agent, or Firm* — Lynn E. Barber (57) ABSTRACT

A drive mechanism for a bicycle is provided including a pedal leverage arm, a drive sprocket spindle, a drive sprocket, a drive gear, and a vertical gear on each side of the bicycle. The vertical gear is attached to the pedal leverage arm so that the vertical gear can mesh with the drive sprocket. A chain on each side of the bicycle extends around the drive gear and a wheel sprocket. Downward movement of a pedal leverage arm causes the attached vertical gear to move downward, causing the meshed drive gear to turn, which causes the drive sprocket spindle on that side of the bicycle to turn, which causes the chain that goes around the drive sprocket on that side of the bicycle to turn, which causes the wheel sprocket and a rear wheel to turn, due to permanent attachment of both the drive sprocket and drive gear to the drive sprocket spindle.

5 Claims, 13 Drawing Sheets

BICYCLE DRIVE MECHANISM WITH PEDAL LEVERAGE ARM

BACKGROUND OF THE INVENTION

1. Field of the Invention

This invention relates to bicycles and other pedal device, and in particular, relates to a pedal device with increased travel distance due to a pedal and leverage arm.

2. Description of the Related Art

A bicycle, while including many variants, is basically a pedal-driven, human-powered vehicle with two wheels attached to a frame, one behind the other. The basic shape and configuration of a typical bicycle has changed little since the first chain-driven model was developed around 1885. Bicycles typically include a frame, a drive unit, and front and rear wheels that are mounted to front and rear ends of the frame, respectively. The drive unit is mounted to the frame and left and right cranks are rotatably mounted to the drive unit.

The great majority of today's bicycles have a frame with upright seating which looks much like the first chain-driven bike. Such upright bicycles almost always feature the diamond frame, a truss consisting of two triangles: the front triangle and the rear triangle. The front triangle consists of the head tube, top tube, down tube and seat tube. The head tube contains the headset, the set of bearings that allows the fork to turn smoothly for steering and balance. The top tube connects the head tube to the seat tube at the top, and the down tube connects the head tube to the bottom bracket. The rear triangle consists of the seat tube and paired chain stays and seat stays. The chain stays run parallel to the chain, connecting the bottom bracket to the rear dropouts. The seat stays connect the top of the seat tube (at or near the same point as the top tube) to the rear dropouts.

The drive train of current bicycles, as generally known in the art, begins with pedals which rotate the cranks, which are held in axis by the bottom bracket. Most bicycles use a chain to transmit power to the rear wheel. A relatively small number of bicycles use a shaft drive to transmit power. A very small number of bicycles (mainly single-speed bicycles intended for short-distance commuting) use a belt drive as an oil-free way of transmitting power.

Since cyclists' legs are most efficient over a narrow range of pedaling speeds (cadence), a variable gear ratio helps a cyclist to maintain an optimum pedaling speed while covering varied terrain. Different gears and ranges of gears are appropriate for different people and styles of cycling. Multi-speed bicycles allow gear selection to suit the circumstances: a cyclist could use a high gear when cycling downhill, a medium gear when cycling on a flat road, and a low gear when cycling uphill. In a lower gear every turn of the pedals leads to fewer rotations of the rear wheel. This allows the energy required to move the same distance to be distributed over more pedal turns, reducing fatigue when riding uphill, with a heavy load, or against strong winds. A higher gear allows a cyclist to make fewer pedal turns to maintain a given speed, but with more effort per turn of the pedals.

With a chain drive transmission, a chain ring attached to a crank drives the chain, which in turn rotates the rear wheel via the rear sprocket(s) (cassette or freewheel). There are four gearing options: two-speed hub gear integrated with chain ring, up to 3 chain rings, up to 11 sprockets, hub gear built in to rear wheel (3-speed to 14-speed). The most common options are either a rear hub or multiple chain rings combined with multiple sprockets (other combinations of options are possible but less common).

With a shaft drive transmission, a gear set at the bottom bracket turns the shaft, which then turns the rear wheel via a gear set connected to the wheel's hub. There is some small loss of efficiency due to the two gear sets needed. The only gearing option with a shaft drive is to use a hub gear.

In each of these prior drive mechanisms, two pedals turn a large gear which turns a smaller gear, generally with the use of a chain. Pushing a pedal from top to bottom means that the cyclist must push forward and then downward twice in one 360° turn of the pedal, which moves the bicycle forward. The main pedal sprocket is turned one time (or 360°), which limits the chain travel to the circumference of the sprocket for each single turn. These prior bicycles require forward motion of the pedal, during which the forward momentum of the bicycle is reduced. Normal bicycle sprockets have a diameter of 6½ inches, with a pedal to pedal distance of 13-16 inches. The sprocket travel per turn is 20.3 inches and pedal to pedal travel is 40.6 inches, and that is overcoming top dead center force twice to turn the pedal.

Other prior pedal devices rely on similar drive mechanisms in which movement of the pedals do not have uniform leverage it their various positions during the pedaling process.

It is therefore an object of the invention herein to provide a bicycle having a pedal and leverage arm, in which bicycle the cyclist's body weight is used to a more efficient potential, because the pivot point is at the rear of the bicycle and the pedal movement is straight down and up.

It is a further object of the invention to provide a bicycle in which the gear location is near the rear wheel and far behind the pedals.

Other objects and advantages will be more fully apparent from the following disclosure and appended claims.

SUMMARY OF THE INVENTION

The invention herein is a drive mechanism for a bicycle including a pedal leverage arm, and a lever arm tension spring holding the rear of the pedal leverage arm to the rear of the bicycle through a bearing as known in the art, to connect the frame to the arm and cause the pedal leverage arm and pedal to be forced upward when the pedal is in the lowermost position. A drive sprocket spindle, drive sprocket, drive gear, and vertical gear are provided on each side of the bicycle. The vertical gear is attached to the pedal leverage arm so that the vertical gear can mesh with the drive gear. A chain on each side of the bicycle extends around the drive sprocket and the wheel sprocket. The drive sprocket spindle on each side of the bicycle extends from the drive gear support, through the drive gear, through the drive sprocket support to the drive sprocket on that side of the bicycle. Downward movement of a pedal leverage arm causes the attached vertical gear to move downward, causing the meshed drive gear to turn, which causes the drive sprocket spindle on that side of the bicycle to turn, which causes the chain that goes around the drive sprocket on that side of the bicycle to turn, which causes the wheel sprocket and rear wheel to turn, due to permanent attachment of both the drive sprocket and drive gear to the drive sprocket spindle.

Other objects and features of the inventions will be more fully apparent from the following disclosure and appended claims.

DETAILED DESCRIPTION OF THE INVENTION AND PREFERRED EMBODIMENTS THEREOF

The present invention comprises an improved bicycle drive mechanism comprising a novel pedal leverage arm, providing a more efficient way to use the body's force than has been previously provided by bicycles or other pedaled structures. There is no leverage when the normal bicycle pedal is stepped on until it travels forward. In contrast, with the bicycle drive mechanism of the invention herein having a pedal leverage arm, the leverage is constant. Because the pedal leverage arm pivot point is far aft in the invention, the leverage driven gears on the sprocket spindles can be turned very easily, turning the sprocket the same rotational distance, and giving the bicycle greater speed with less pedal pressure, with the efficiency of the invention herein is due to the leverage of the pedal leverage arm.

In summary, the invention herein provides an improved drive mechanism for a pedaled structure in which there is a pedal leverage arm and a series of gears on each side of the bicycle. The pedal leverage arm of the invention drives a drive gear which drives the drive sprocket as discussed herein. It is understood that the invention is symmetrical with identical mirror-image portions of the invention on each side of the bicycle.

In particular, the drive mechanism for a bicycle herein, where the bicycle has a front wheel, a rear wheel having a wheel sprocket, and a seat support, comprises a frame including a lever arm bracket having a rear connection point, a drive sprocket support, and a drive gear support outside the drive sprocket support forming a space between the drive sprocket support and the drive gear support; a pedal leverage arm on each side of the bicycle, each pedal leverage arm connected to the rear connection point and having a pedal mounted on a forward end of the pedal leverage arm; a drive sprocket spindle on each side of the bicycle; a drive sprocket on each side of the bicycle; a drive gear on each side of the bicycle; a vertical gear on each side of the bicycle, attached to the pedal leverage arm on that side of the bicycle so that the vertical gear can mesh with the drive gear on that side of the bicycle; and a chain on each side of the bicycle extending around the drive sprocket and the wheel sprocket; wherein the drive sprocket spindle on each side of the bicycle extends from the drive gear support, through the drive gear, through the drive sprocket support to the drive sprocket on that side of the bicycle; and wherein downward movement of a pedal leverage arm causes the attached vertical gear to move downward, causing the meshed drive gear to turn, which causes the drive sprocket spindle on that side of the bicycle to turn, which causes the chain that goes around the drive sprocket on that side of the bicycle to turn, which causes the wheel sprocket and rear wheel to turn, due to permanent attachment of both the drive sprocket and drive gear to the drive sprocket spindle.

Figure 1:
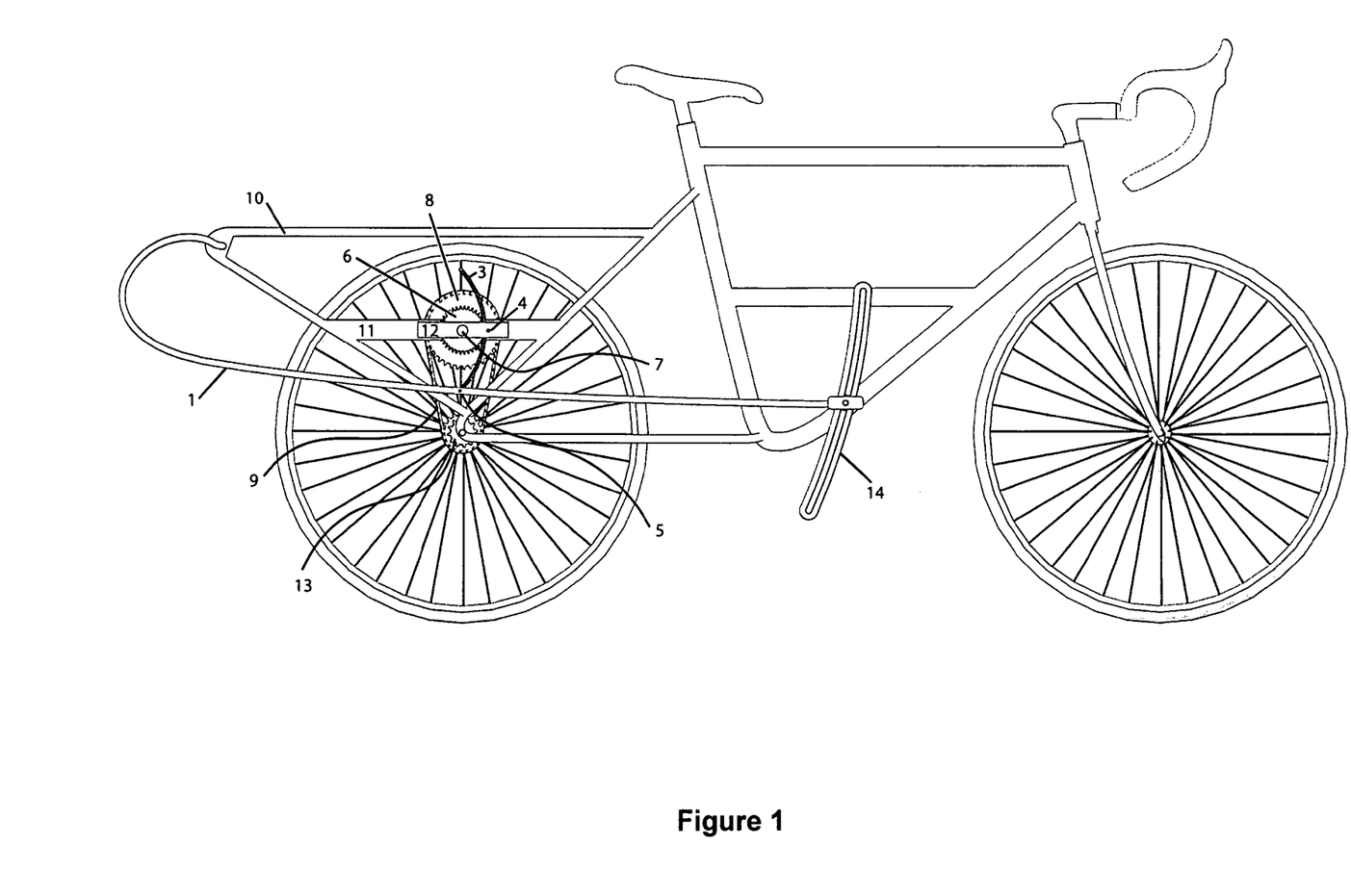
FIG. 1 is a side elevational view of a bicycle having the bicycle drive mechanism of the invention.
Figure 2:
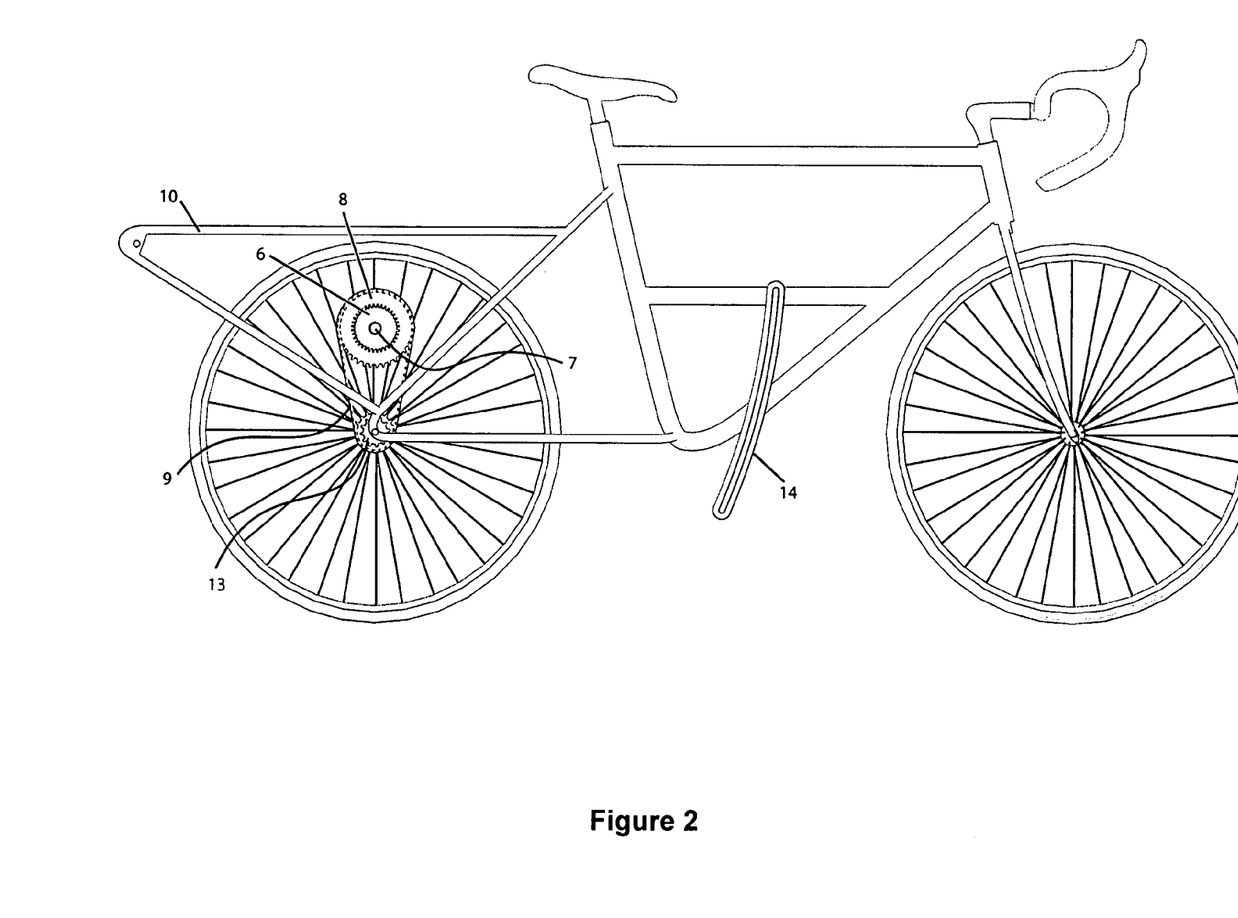
FIG. 2 is a side elevational view of the bicycle of FIG. 1 in which the pedal leverage arm has been removed to show the underlying drive portion of the bicycle drive mechanism.
Figure 3:
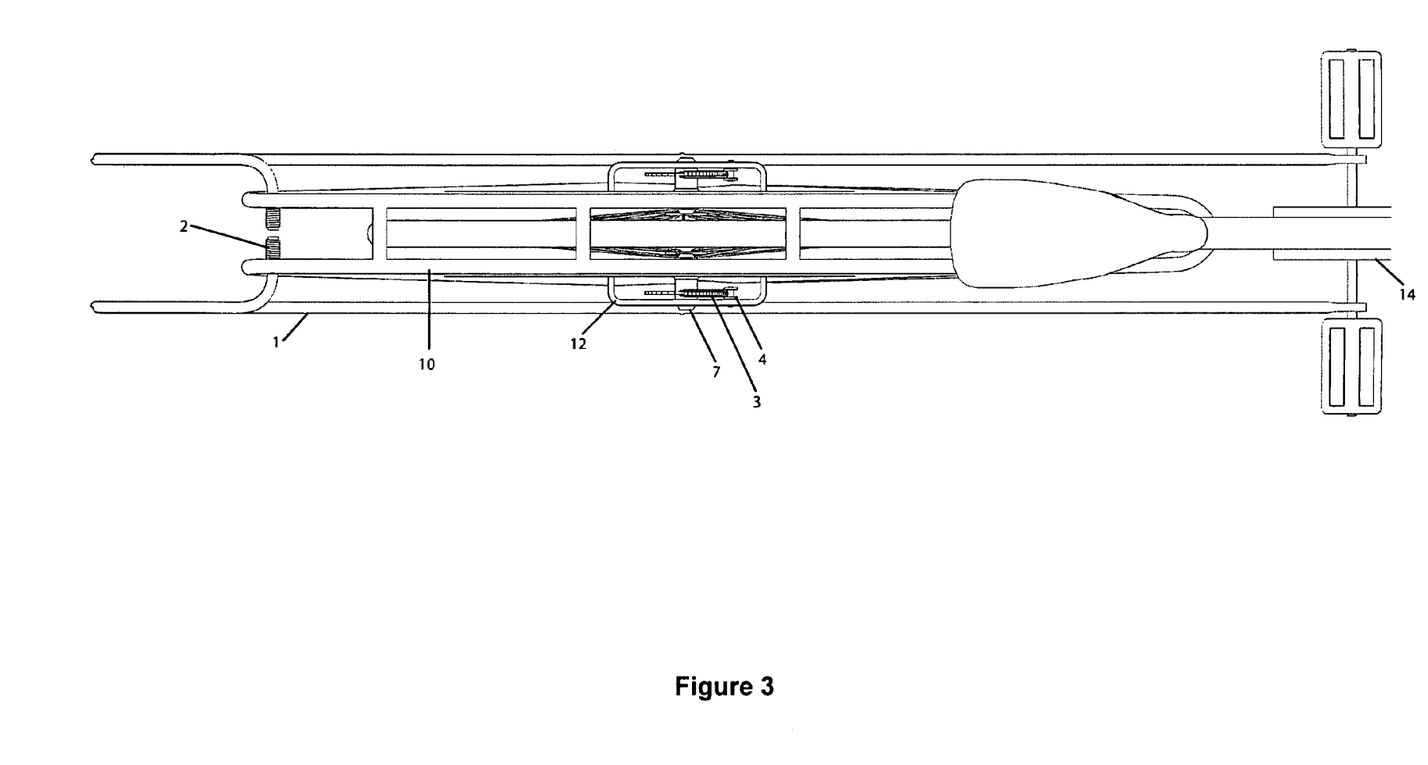
FIG. 3 is a top plan view of the bicycle of FIG. 1.
Figure 8:
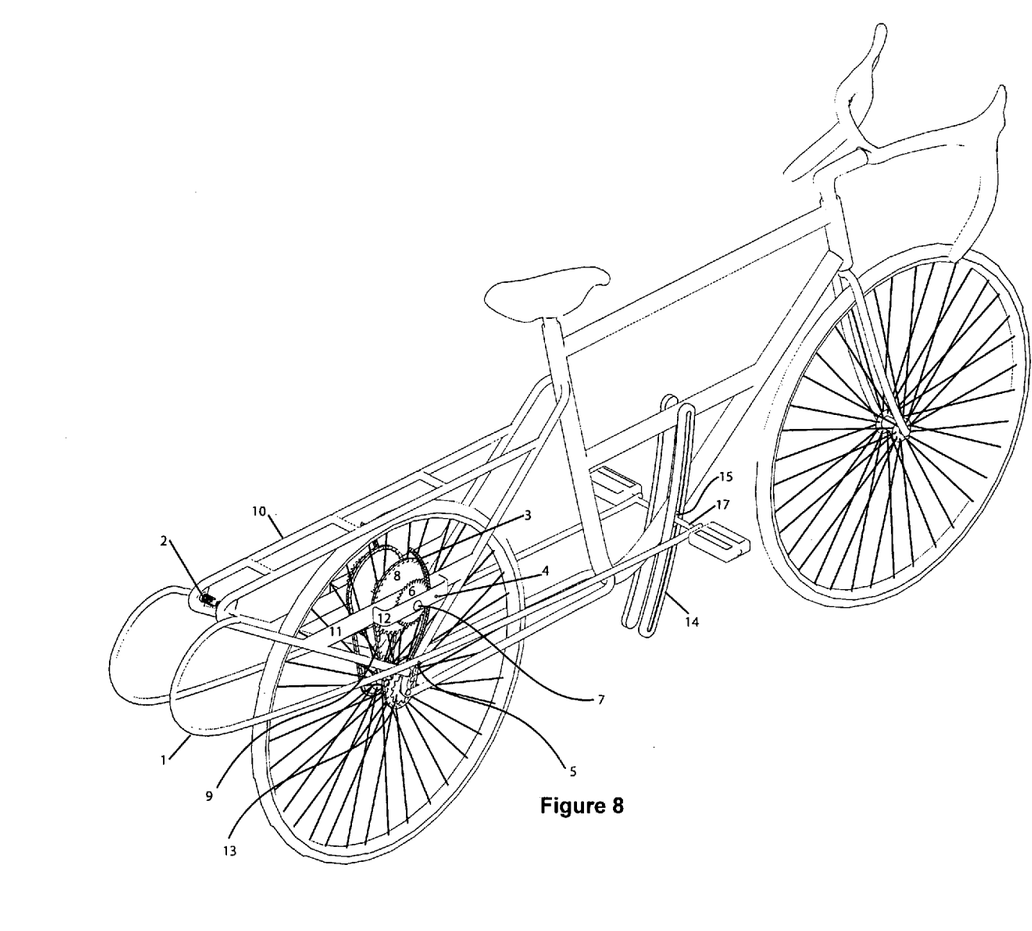
FIG. 8 is a rear-side perspective view of the bicycle of FIG. 1 showing the lever arm stabilizer guide.
Figure 9:
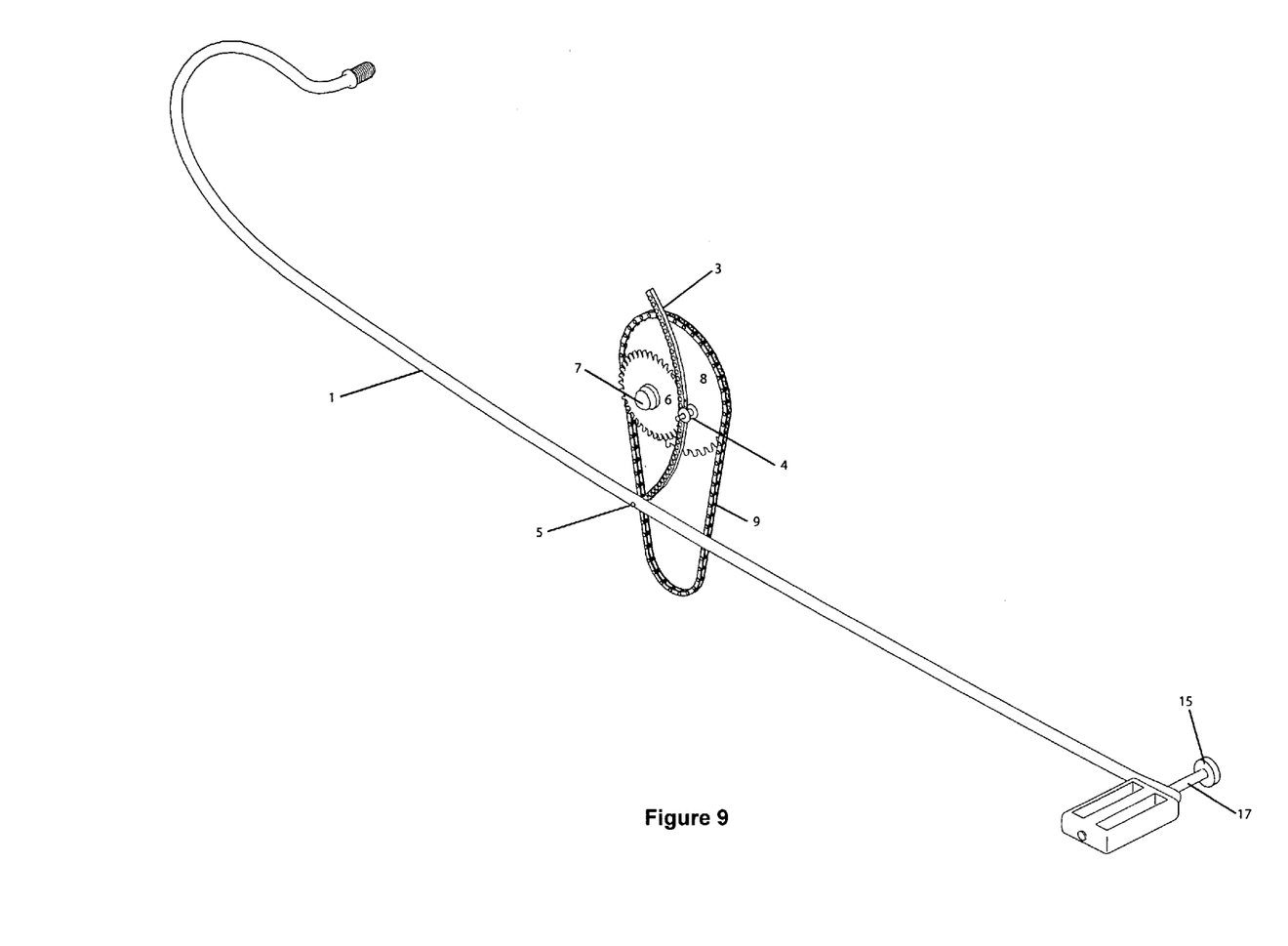
FIG. 9 is a side perspective view of the bicycle drive mechanism for one side of a bicycle.
Figure 10:
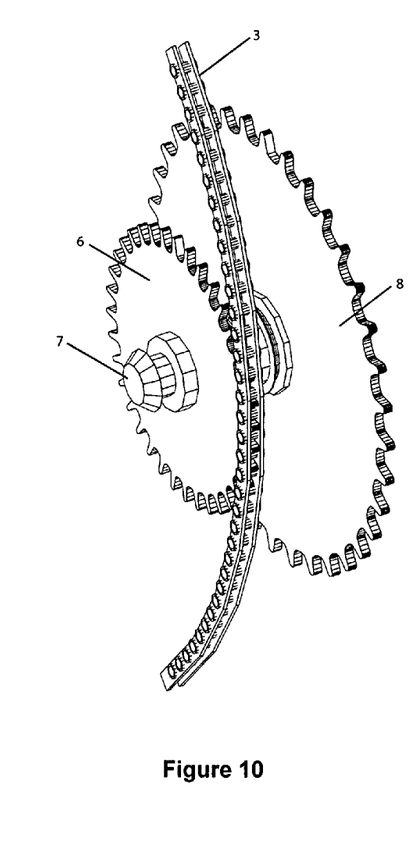
FIG. 10 is side perspective view of the vertical gear, drive sprocket, drive sprocket spindle and drive gear for one side of a bicycle.

Referring now to the figures, the bicycle outfitted with the invention herein has a generally triangular-shaped frame on each side of the bicycle as shown (FIGS. 1-2 and 8) with one forward length that extends downward at an angle from the seat support to the central axis of the rear wheel and a second rear length that extends upward from the central axis of the rear wheel to a point at or near the rear of the rear wheel. Between the upper end of the forward length and the rear length a lever arm bracket 10 (FIG. 3) extends, providing a triangular frame as shown in FIGS. 1-2 and 8. Other framing parts as known in the art preferably connect the rear wheel to the seat support and the front wheel to the bicycle.

Figure 5A:
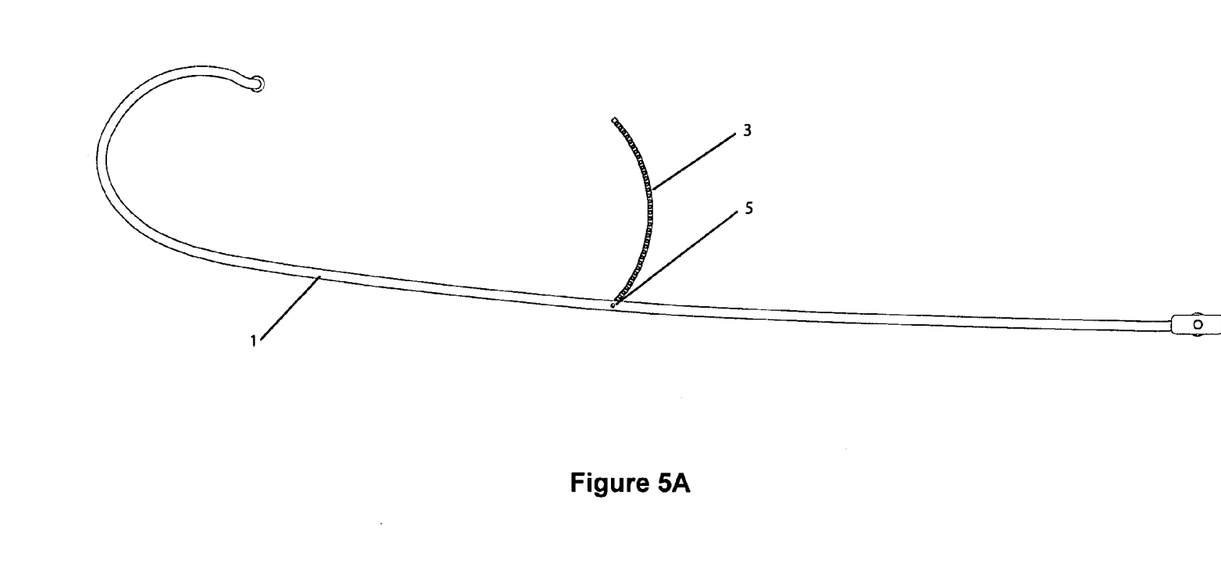
FIG. 5A is a side elevational view of the pedal leverage arm and vertical gear of the bicycle of FIG. 1.
Figure 5B:
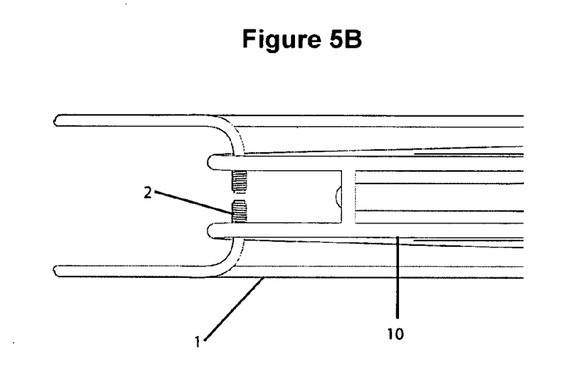
FIG. 5B is a top plan view of the rear of the bicycle of FIG. 1.
Figure 6:
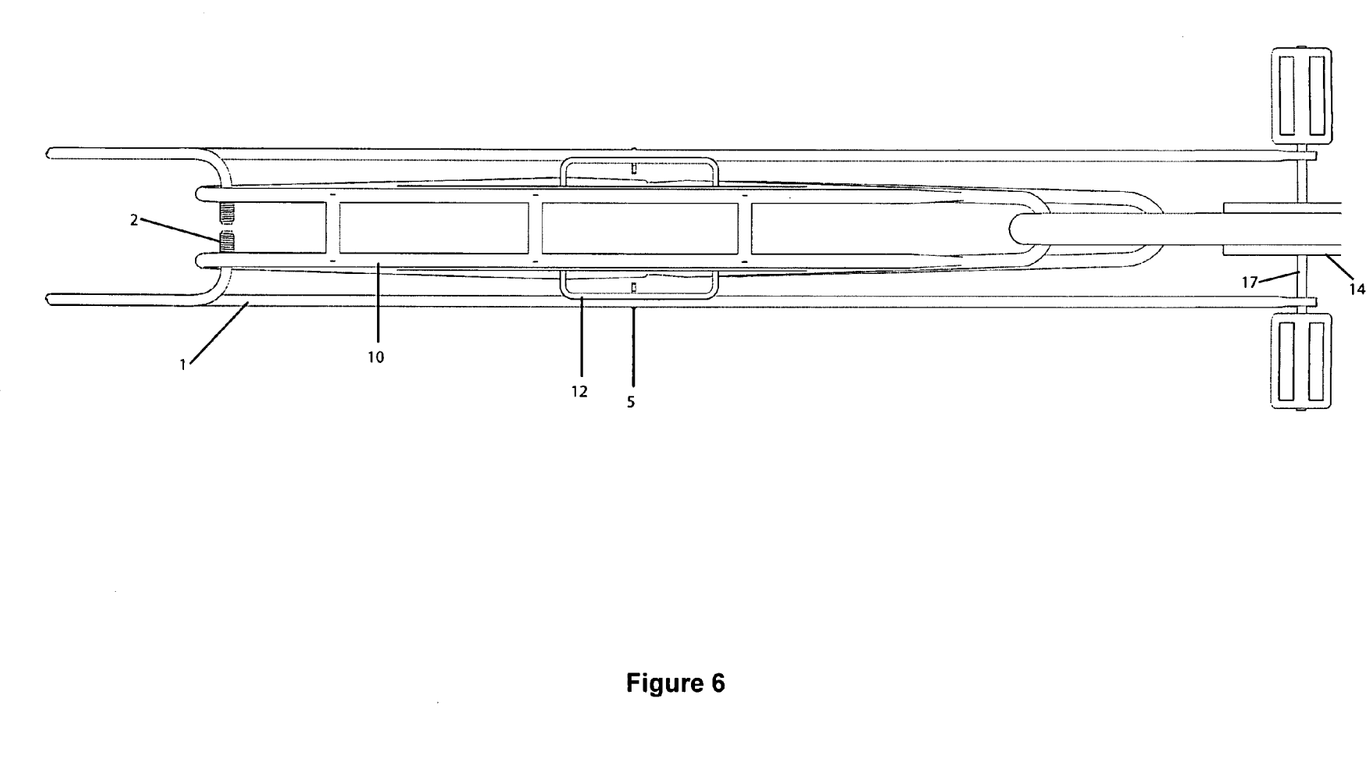
FIG. 6 is a top plan view of the bicycle drive mechanism of the invention.
Figure 11:
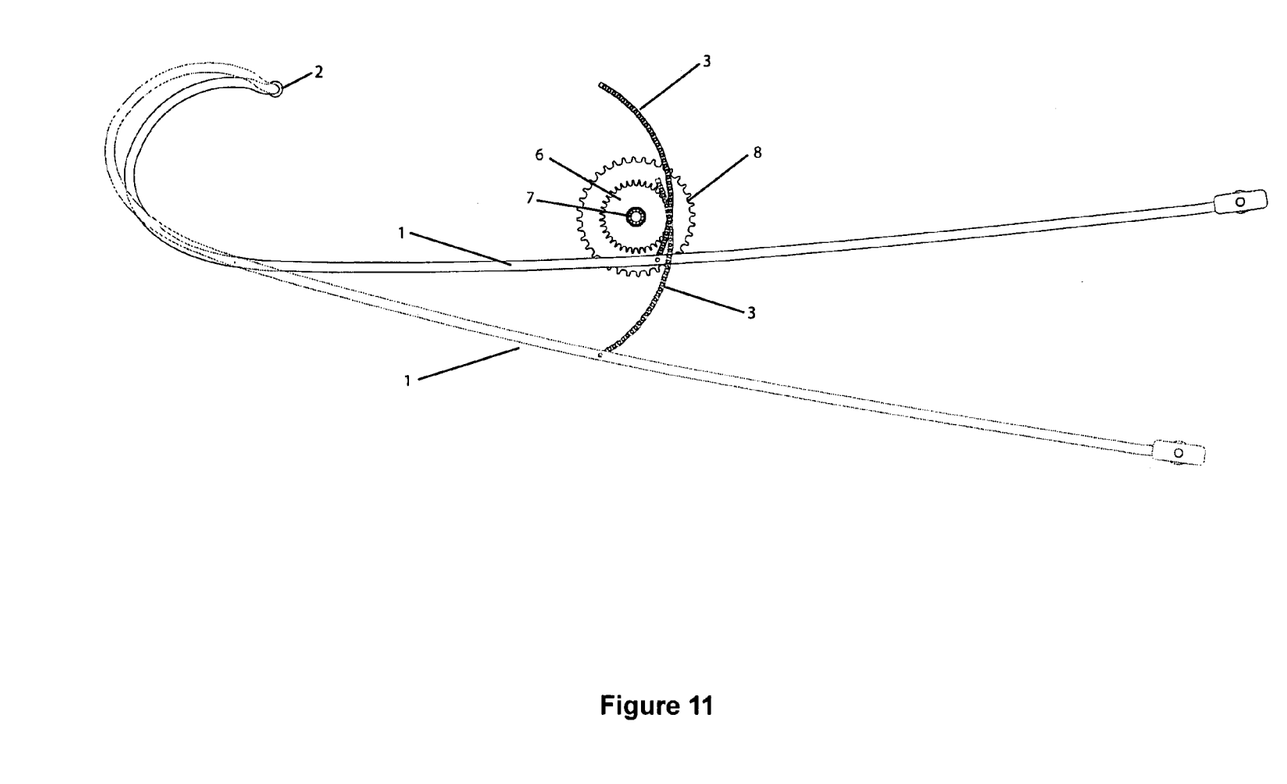
FIG. 11 is a side elevational view of the pedal leverage arm in two positions during pedaling of a bicycle equipped with the bicycle drive mechanism of the invention.

The invention provides two pedal leverage arms 1, one on each side of the bicycle. The connection or pivot point of the pedal leverage arm 1 is normally aft of the rear wheel's axle. Each pedal leverage arm 1 is basically horizontal (parallel to the ground) with some curve to its structure as discussed further herein. Each pedal leverage arm is a linear metal structure having a pedal on the forward end which is located below and slightly forward of the bicycle seat in a position analogous to pedals on prior art bicycles. The pedal leverage arm 1 extends rearward, preferably at a slight upward angle as shown (the exact angled not being critical), and then curves upward in a C-shape as shown, with a rounded right angle bend (FIG. 5B and FIG. 6) so that the two rear ends of the pedal arms are adjacent each other as shown. There is a lever arm tension spring 2 attached to the rear end of each pedal leverage arm 1 and to the rear end of the lever arm bracket 10 at a pivot point. The spring 2 may be a coil or straight (leaf) spring as known in the art having sufficient tension to make the attached pedal leverage arm and pedal go upward from a down position when weight on the pedal is removed or lessened as the bicycle rider shifts weight to the other pedal. Two positions of the pedal leverage arm 1 with respect to the lever arm bracket 10 are shown in FIG. 11. The leverage arm shape and location are critical to the optimal performance of the invention herein. The springs on the bicycle may be replaced, by the manufacturer or owner, with springs of higher or lower tension as desired to provide increased or decreased force of the upward movement of the attached pedal leverage arm and pedal.

Figure 4:
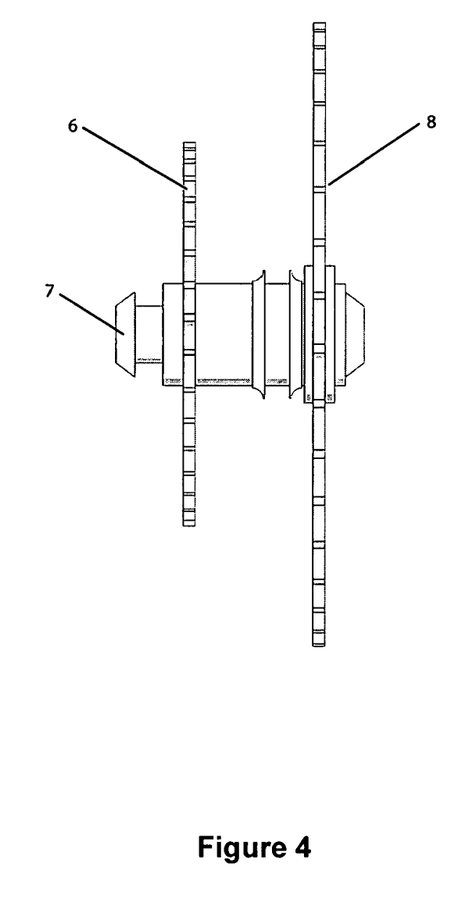
FIG. 4 is a rear elevational view of the left side drive portion of the pedal leverage arm device of the invention.
Figure 7:
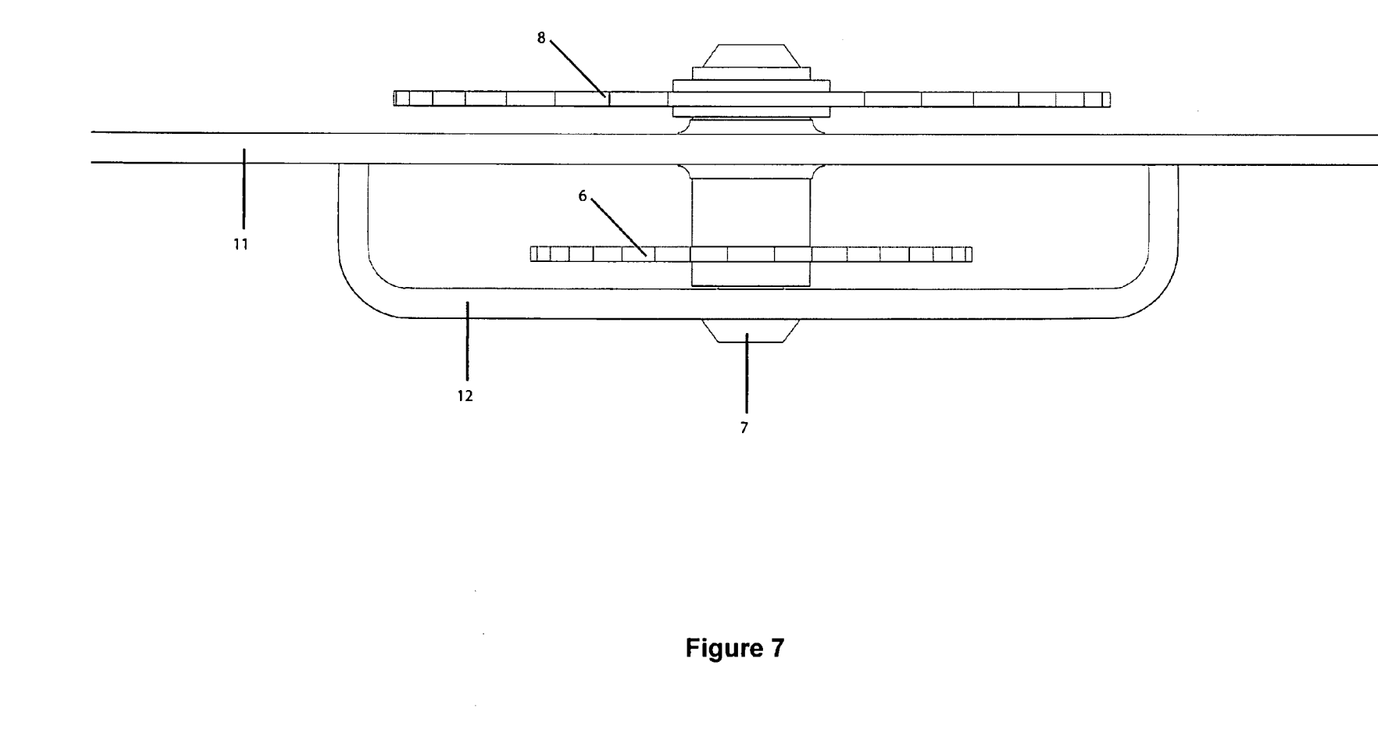
FIG. 7 is a top plan view of the drive gear support, drive sprocket and drive gear for one side of a bicycle.

Between the forward length of the triangular frame and the rear length of the triangular frame, a drive sprocket support 11 extends, preferably horizontally parallel to the lever arm bracket (FIGS. 1, 7, 8). Parallel to the drive sprocket support 11 and preferably about one inch outside of the drive sprocket support 11, a drive gear support 12 is mounted. As used herein, the term "outside" refers to a location farther from the central horizontal axis of the bicycle, and farther from the wheel. Located within the space between the drive gear support 12 and the drive sprocket support 11 is the drive gear 6 (FIGS. 7-8). The drive sprocket 8 is fixedly mounted on a drive sprocket spindle 7 (FIGS. 3-4 and 7) that extends from the drive gear support 12, through the drive gear 6, through the drive sprocket support 11 to a drive sprocket 8 that is also fixedly mounted on the drive sprocket spindle 7 (FIG. 4). The drive sprocket spindles 7 for each side of the bicycle are separate. This gear arrangement is doubled, with an identical arrangement on each side of the rear wheel. These identical gear arrangements are supported by being mounted on the frame of the bicycle as discussed herein. The drive gear 6, in accord with its name, is driven by the up and down movement of the pedal leverage arm 1 and the vertical gear 3 (see below).

A vertical gear 3 is attached to each pedal leverage arm 1, in a generally middle position 5 below and forward of the drive gear 6 so that the vertical gear 3 can mesh with the drive gear 6 on that side of the bicycle (FIG. 5A and FIGS. 8-10). These vertical gears 3 are thus about perpendicular (90°) to the axis of the pedal leverage arm 1. Preferably each vertical gear 3 is made of steel and is about 16-18 inches long. Each vertical gear 3 is held in a slightly curved position by means of a vertical gear bearing 4 (FIGS. 1 and 9) attached to the drive gear support 12 and pushing the vertical gear 3 so that it meshes with the drive gear 6.

The drive gear 6 and the drive sprocket 8 and drive chain 9 on a particular side of the bicycle always move together or forward when the vertical gear 3 moves downward. Downward movement of a pedal leverage arm 1 causes the attached vertical gear 3 to move downward, causing the meshed drive gear 6 to turn, which causes the drive sprocket spindle 7 on that side of the bicycle to turn, which causes the drive chain 9 that goes around the drive sprocket 8 on that side of the bicycle to turn, which causes the wheel sprocket 13 and wheel to turn, due to permanent attachment of both the drive gear 6 and drive sprocket 8 to the drive sprocket spindle 7. Alternating downward motion of the pedals causes the bicycle to move forward so long as there is any downward movement of a pedal.

When the lower limit of pedal movement is reached on a side, the wheel sprocket 13 is released on that side as is the drive sprocket spindle 7 due to the ratcheting as known in the art in the hub of the wheel and the gear, and the spring 2 causes the pedal leverage arm 1 and pedal on that side to move upward. Of course, the spring 2 may be located elsewhere on the bicycle and have the same effect.

To optimize controlled movement of the two pedals, a lever arm stabilizer guide with track 14 may be provided, attached to the frame of the bicycle below the seat as shown in FIGS. 1-2 and 8). The track on the lever arm stabilizer guide allows for movement of a centrally extended pedal shaft 17 on each pedal.

Figure 12:
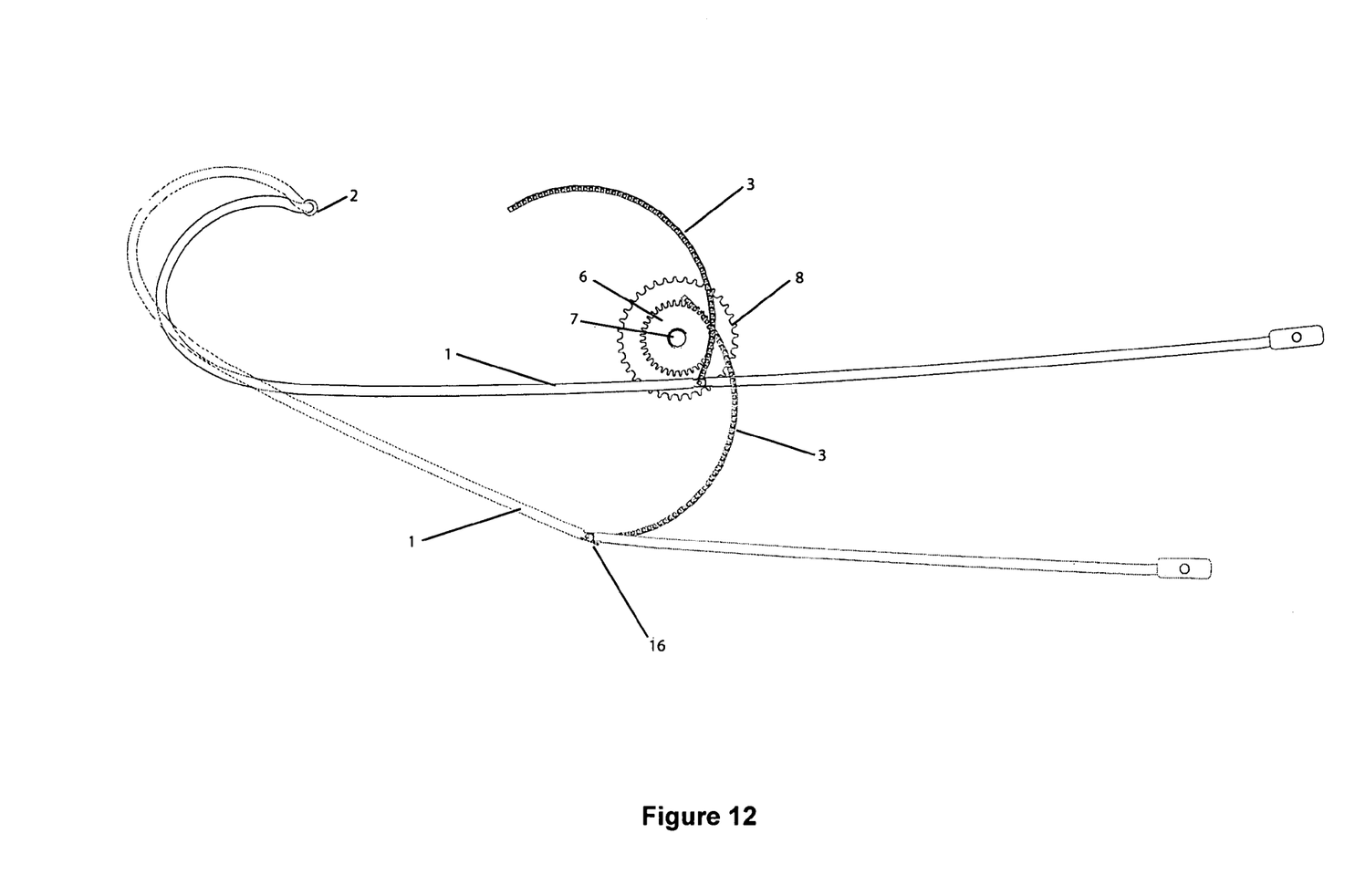
FIG. 12 is a side elevational view an alternative embodiment of the pedal leverage arm, having a lever arm breakaway pivot joint, in two positions during pedaling.

In an alternative embodiment of the invention herein shown in FIG. 12, the pedal leverage arm 1 has a lever arm breakaway pivot joint 16. This lever arm breakaway pivot joint, in conjunction with a longer vertical gear 3 (e.g., about an extra 3 inches) as shown, provides increased range of movement of the pedal due to movement of the pedal leverage arm down and rearward for more vertical gear travel.

Figure 13:
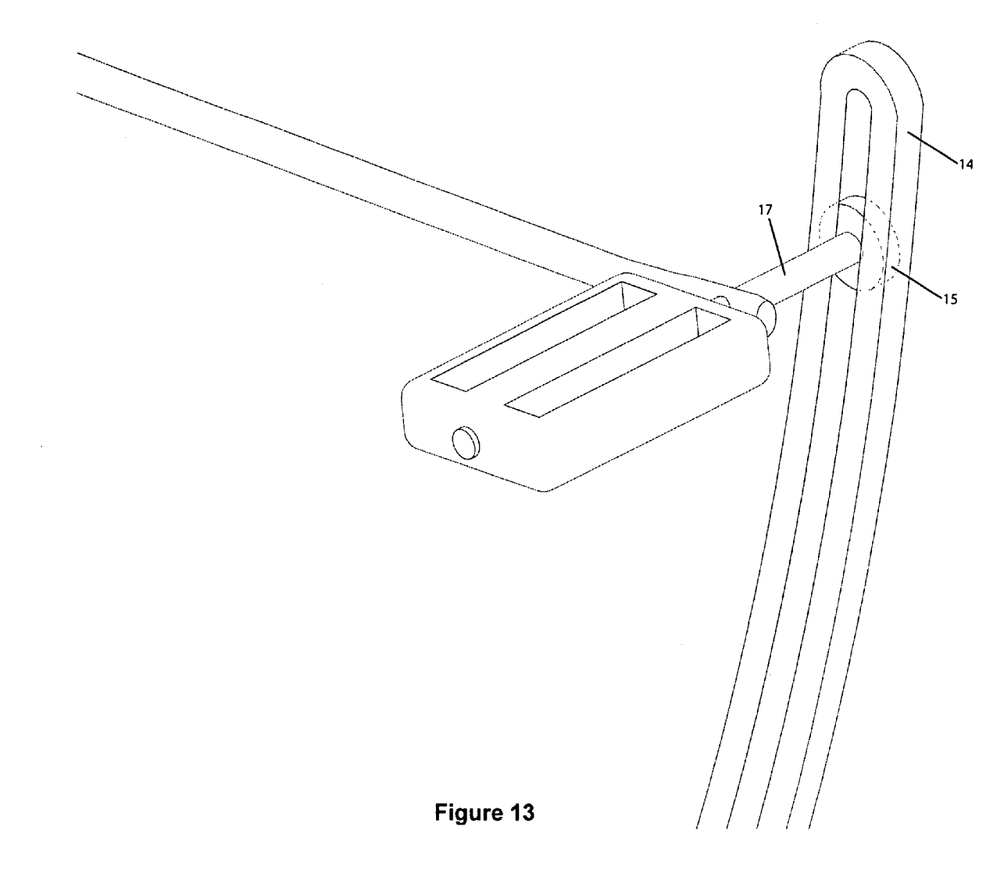
FIG. 13 is a partial perspective view of the lever arm stabilizer guide and track, and the lever arm stabilizer wheel of the invention.

The invention further preferably includes a lever arm stabilizer wheel 15 as shown in FIG. 13, which rides on the track inside each stabilizer guide 14, preventing friction and maintaining the pedal stabilization by rolling up and down the track.

In addition to the structural components of the invention discussed above, the invention may be structured to also include cams or pulleys as known in the art, for example in gym equipment, to assist in turning the gears. Multiple gears, allowing shifting, as known in the art may be incorporated without departing from the invention herein.

In the pedal leverage arm of the invention herein, the pedal leverage arm travels about 26-28 inches of movement, meaning 13-14 inches on one side and the same on the other side of the bicycle. This is about ⅓ less movement in inches than in the standard prior conventional bicycles, which is 40-44 inches in one full turn. This is due to the fact that in the invention herein, the pedal force is straight down and there is no forward or backward pedal movement. With the use of the vertical gear, there is significantly greater sprocket travel than in prior bicycles. For example, with a 4.17 inch drive gear on the sprocket shaft and a 13 inch pedal movement, a full-size sprocket can turn 360° which is due to the force from the leverage of the pedal leverage arm and the cyclist's weight on the pedal being so far forward of the gears. Thus with the invention, there are two full turns of the larger leverage driven sprocket in 26 inches of travel. With the invention, depending on the size of the drive gear, much higher speeds can be easily attained than with conventional bicycles.

While particular suggested dimensions are provided herein, particularly for use with a standard-sized bicycle frame, it is clear that the invention herein may be sized smaller or larger with the same advantageous results.

It is also within the scope of the invention herein to provide other wheeled, pedaled vehicles with the drive mechanism and pedal leverage arm of the invention herein.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A drive mechanism for a bicycle having a front wheel, a rear wheel having a wheel sprocket, and a seat support, comprising:
    a) a frame on each of two sides of the bicycle including a lever arm bracket having a rear connection point, a drive sprocket support, and a drive gear support outside the drive sprocket support forming a space between the drive sprocket support and the drive gear support;
    b) a pedal leverage arm on each side of the bicycle, each pedal leverage arm connected to the rear connection point and having a pedal mounted on a forward end of the pedal leverage arm;
    c) a drive sprocket spindle on each side of the bicycle;
    d) a drive sprocket on each side of the bicycle;
    e) a drive gear on each side of the bicycle;
    f) a vertical gear on each side of the bicycle, attached to the pedal leverage arm on that side of the bicycle so that the vertical gear can mesh with the drive gear on that side of the bicycle; and
    g) a chain on each side of the bicycle extending around the drive sprocket and the wheel sprocket; wherein the drive sprocket spindle on each side of the bicycle extends from the drive gear support, through the drive gear, through the drive sprocket support to the drive sprocket on that side of the bicycle; and wherein downward movement of a pedal leverage arm causes the attached vertical gear to move downward, causing the meshed drive gear to turn, which causes the drive sprocket spindle on that side of the bicycle to turn, which causes the chain that goes around the drive sprocket on that side of the bicycle to turn, which causes the wheel sprocket and rear wheel to turn, due to permanent attachment of both the drive sprocket and drive gear to the drive sprocket spindle.

2. The drive mechanism of claim 1, wherein each pedal leverage arm extends rearward at an upward angle, and then curves upward in a C-shape, with a rear end of the two pedal leverage arms adjacent each other and attached to the lever arm bracket with a spring.

3. The drive mechanism of claim 1, wherein the vertical gears are substantially perpendicular to an axis of the pedal leverage arm and are held in a slightly curved position by means of a vertical gear bearing attached to the drive gear support that pushes the vertical gear so that the vertical gear meshes with the drive gear.

4. The drive mechanism of claim 2, wherein when a pedal reaches a lowest point in pedaling, the wheel sprocket and drive sprocket spindle are released and the spring causes the pedal leverage arm and pedal to move upward.

5. The drive mechanism of claim 1, further comprising a lever arm stabilizer guide attached to the bicycle frame, having a track for movement of an extended pedal shaft on each pedal.

* * * * *